Figure 3:
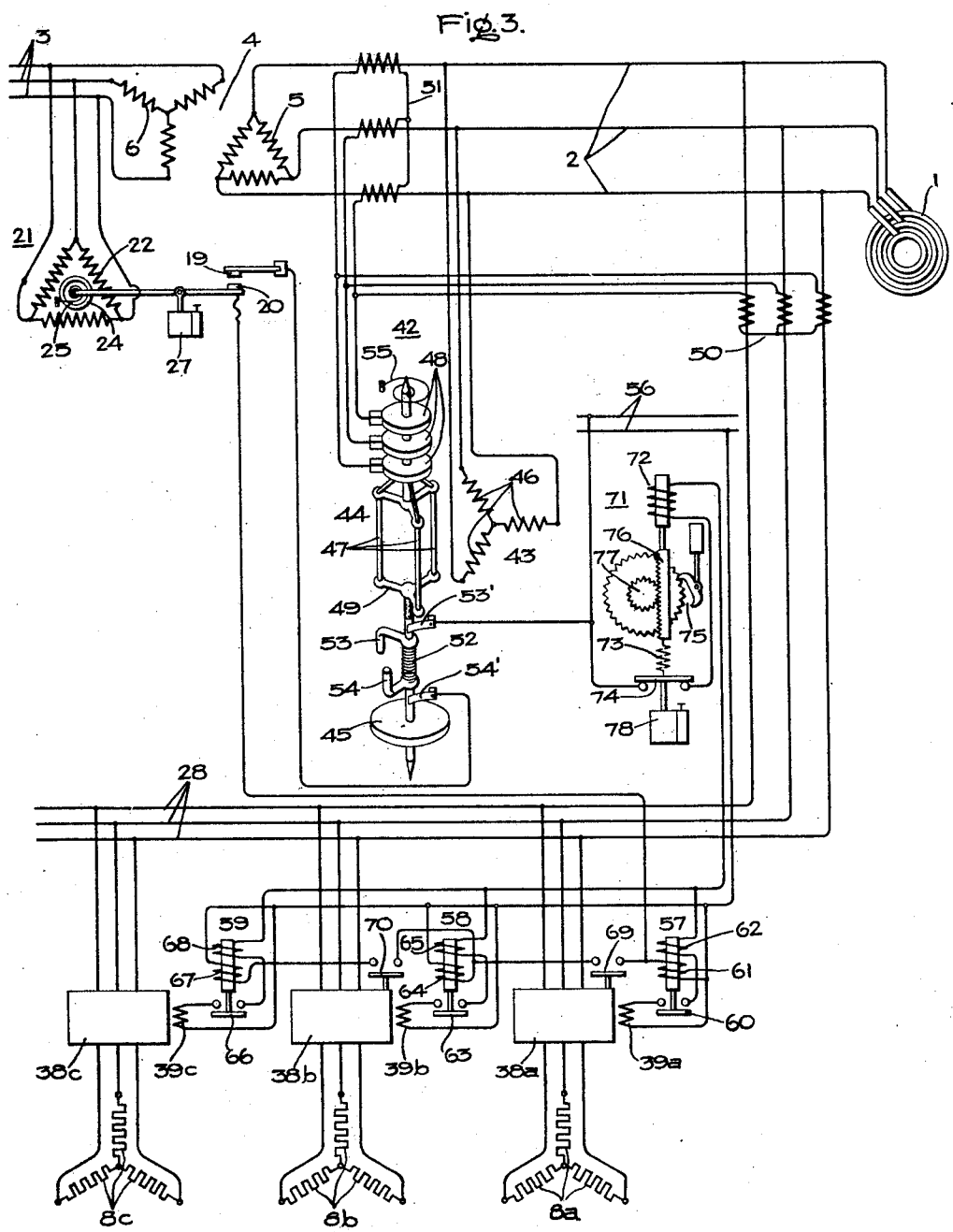

Dec. 1, 1931.  W. F. SKEATS  1,834,807
SYSTEM OF ELECTRICAL DISTRIBUTION
Filed Aug. 30, 1929  2 Sheets-Sheet 1
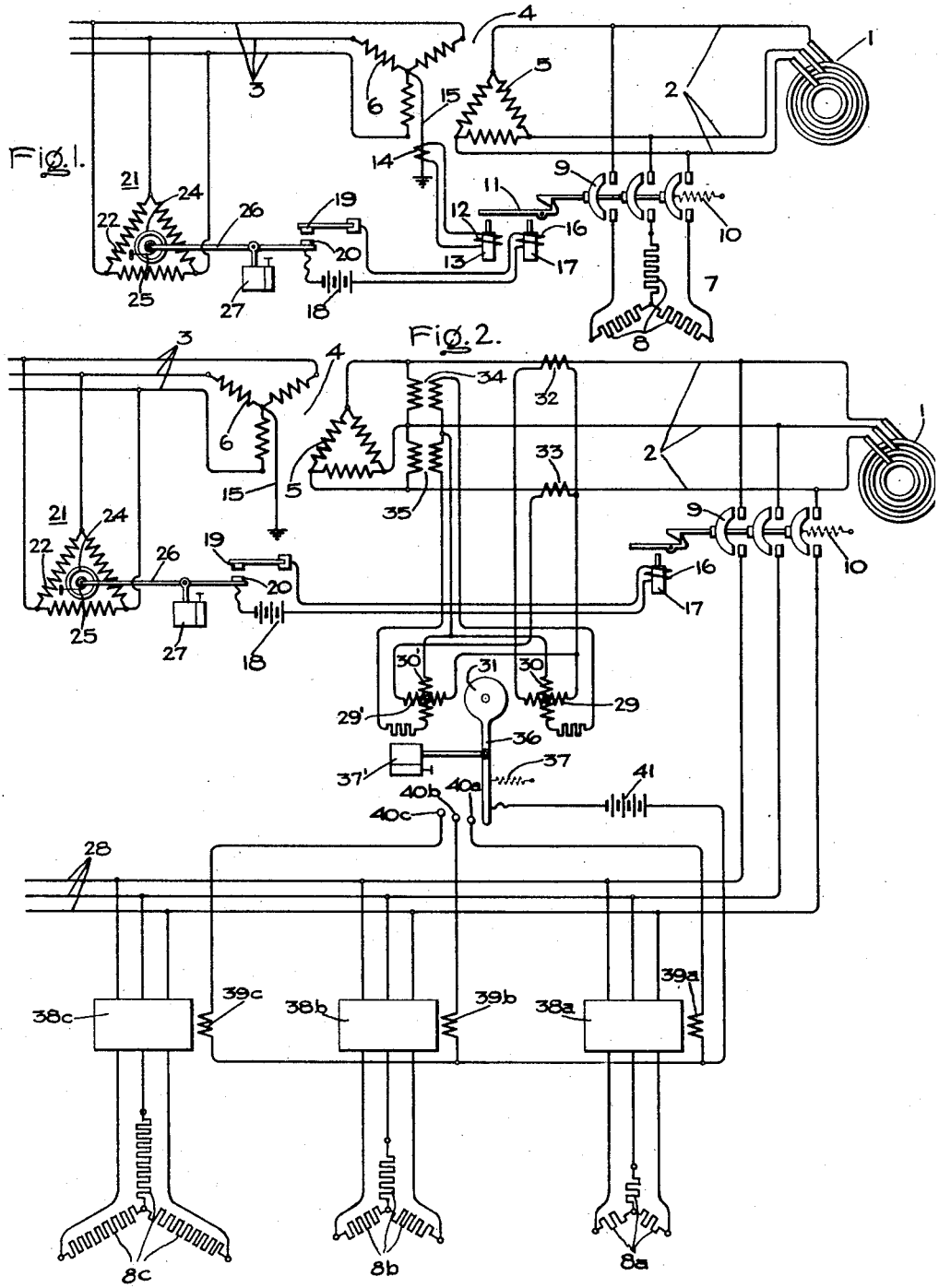
Inventor:
Wilfred F. Skeats,
by Charles E. Mullan
His Attorney.

Dec. 1, 1931.  W. F. SKEATS  1,834,807

SYSTEM OF ELECTRICAL DISTRIBUTION

Filed Aug. 30, 1929  2 Sheets-Sheet 2

Inventor:
Wilfred F. Skeats,
by Charles E. Tullar
His Attorney.

Patented Dec. 1, 1931

1,834,807

UNITED STATES PATENT OFFICE

WILFRED F. SKEATS, OF SCOTIA, NEW YORK, ASSIGNOR TO GENERAL ELECTRIC COMPANY, A CORPORATION OF NEW YORK

SYSTEM OF ELECTRICAL DISTRIBUTION

Application filed August 30, 1929. Serial No. 389,562.

My invention relates to systems of electrical distribution and more particularly to high voltage electrical power transmission systems.

In a power transmission system wherein a generator supplies electrical energy to a substantially concentrated load over a transmission line and a short circuit occurs on the transmission line it may happen that the generator will lose a large part of its load, that is, its kilowatt load, since the current under short circuit conditions is substantially in quadrature relation with the voltage. Consequently the speed of the generator increases abnormally and the generator tends to pull out of synchronism with its load before the short circuit is removed. In case the generator is supplying the load over a transmission circuit comprising two lines in parallel and one line is switched off because of a fault or short circuit the generator may speed up sufficiently so as to be out of phase with the rest of the system and consequently lose synchronism with the rest of the system. In either case the power limit or stability of the system under transient disturbances is materially limited.

An object of my invention is to provide improved means for increasing the stability of an alternating current power transmission system.

Another object of my invention is to provide improved means for preventing the speeding up of an alternating current generator suddenly cut off from its load so as to prevent loss of synchronism and thereby instability during transient disturbances in the system.

In accordance with my invention means are provided for imposing a predetermined load on the generator upon the occurrence of a fault in the transmission line supplied thereby by suddenly closing a low tension switch which connects a substantially non-reactive load across the generator terminals for a predetermined interval of time.

My invention will be better understood from the following description taken in connection with the accompanying drawings and its scope will be pointed out in the appended claims.

In the drawings Fig. 1 is a simplified diagrammatic representation of a simple embodiment of my invention in a three-phase distribution system, Fig. 2 is a modification of the arrangement shown in Fig. 1 wherein the generator is artificially loaded in accordance with the load being supplied by the generator at any particular instant, and Fig. 3 is another modification in which the magnitude of the artificial load is determined by the amount of load suddenly lost over the transmission line.

Referring to Fig. 1 of the drawings, an alternating current generator is diagrammatically represented by a three-phase alternator 1 which is connected to a low-voltage distribution bus 2. The low-voltage distribution bus 2 is connected to energize a high-voltage transmission line 3 through a suitable step-up transformer 4 having a primary winding 5 connected to the bus 2 and a high-voltage secondary winding 6 connected to the transmission line 3. As shown the transformer windings are delta-connected on the primary side and star-connected on the secondary side, but it will be obvious to those skilled in the art that my invention is not limited to any particular connection of the transformer windings. In accordance with my invention an auxiliary substantially non-reactive load 7 which may be grid resistors, a waterbox, or similar convenient resistor load, is provided to be connected across the low-voltage bus in accordance with fault conditions on the transmission line. As shown the auxiliary load includes resistors 8 connected in star and connected to the bus 2 through suitable rapid-closing switching means indicated by the switch 9 which is normally maintained in the circuit interrupting position. The switching means 9 may be of the well known quick-acting type, such for example as the type described and claimed in Tritle Reissue Patent No. 15,441 of August 29, 1922, and assigned to the assignee of the present application. However, since the particularly type of switch used forms no part of my invention I have, for purposes of simplicity, shown the switch 9 very diagrammatically as a three-phase switch which is strongly biased toward a circuit-closing position by means of a spring 10 and held normally in the circuit interrupting position by a latch 11. The switch 9 is arranged to be operated by any suitable fault-indicating means which operates preferably in response to one symmetrical phase sequence component or a function of symmetrical phase sequence components of an electrical characteristic of the transmission line 3. As shown the switch 9 is provided with an operating winding 12 having a plunger 13 for disengaging the latch and is connected to be energized in accordance with the zero phase sequence current through a suitable transformer 14 connected in the ground connection 15 from the neutral of the star-connected transformer secondary winding 6. The switch 9 is also provided with a second operating winding 16 having a plunger 17 for disengaging the latch and is connected to be energized in accordance with the polyphase voltage conditions in the transmission line 3. The winding 16 is connected in circuit with a source of energization indicated by a battery 18 and this circuit contains cooperating contacts 19 and 20 which are normally maintained out of engagement so that the coil 16 is normally deenergized.

The engagement of the contacts 19 and 20 and thereby the energization of coil 16 is preferably controlled by means that will close the contacts when the voltage falls below a predetermined value on any one or all of the phases of the distribution circuit. For this purpose I employ a torque motor device 21 of the type described and claimed in United States Letters Patent No. 1,743,798, granted January 14, 1930 upon an application of Robert H. Park, and assigned to the assignee of the present application. The torque motor device 21 comprises a polyphase primary or inducing winding 22 for producing a rotating magnetic field and arranged on the inner periphery of a stator core member of the type employed for induction motors in the usual manner of a polyphase distributed winding. Cooperating with the inducing winding 22 is a rotatable closed circuit secondary or induced member 24 which is preferably constructed in the form of a hollow steel shell. The torque of the rotatable member 24 under predetermined normal conditions in the transmission line 3 is counter-balanced by the torque of a spring 25. This torque is proportional to the difference between the magnitudes of the squares of the positive and negative phase sequence components of the voltage of transmission line 3 and is satisfactory under the usual conditions encountered in practice for indicating any fault condition which causes an unbalanced voltage condition. A arm 26 is connected to be actuated by the rotatable member 24 and carries the contact 20. A dashpot 27 or other suitable damping means is connected to the arm 26.

The operation of the arrangement illustrated in Fig. 1 is substantially as follows: It will be assumed that the generator 1 is in operation and supplying a load over the transmission line 3 at the normal operating voltage under balanced current and voltage conditions. Now if a short circuit occurs on the transmission line 3 between, for example, one phase conductor and ground a zero phase sequence current will flow in the ground connection 15 and cause the operating winding 12 of the switch 9 to be energized so that latch 20 is released and switch 9 moves quickly to a circuit-closing position under the action of spring 10. The resistor 8 is thereby connected in parallel to the generator terminals and is arranged to be of such a value that approximately the same load will be maintained on the generator as before the occurrence of the short circuit. The voltage responsive device 21 will also be operative under the conditions assumed to energize the operating winding 16 since the torque on the rotatable member 24 is reduced sufficiently so that the spring 25 will close contacts 19 and 20 and establish an energizing circuit to coil 16 from battery 18. Ordinarily it will be sufficient to provide only the device 21 for operating the tripping means since it will be effective under practically all fault conditions met with in practice.

In Fig. 2 of the drawings I have shown diagrammatically the same general type of distribution system shown in Fig. 1 but have shown a modification of my invention which is applicable for use in systems where the load on the generator is of a variable instead of a substantially constant load as assumed in the system shown in Fig. 1. In this modification apparatus corresponding to that shown in Fig. 1 is designated by corresponding reference numerals but additional means are provided for varying the value of the load connected across the generator terminals by the quick-closing switch in accordance with the load being transmitted over the transmission line. As shown, by way of example, three resistor loads 8a, 8b and 8c are connected across an auxiliary bus 28 in three independent circuits. The bus 28 is connected through the quick-acting switch 9 across the terminals of generator 1. For determining the load connected across the bus 28 I provide a power responsive device which is illustrated in the form of a polyphase induction-type wattmeter having two sets of current elements 29 and 29' and two sets of potential elements 30 and 30' acting on a common disk 31. The power responsive device is not restricted in any respect to any particular type and may be of the well known electro-dynamometer type of wattmeter in which the current coils are fixed and the voltage coils are mounted on a movable shaft and placed between the current coils. The current coils 29 and 29′ are connected to be energized in accordance with the current flowing in the low-voltage distribution bus 2 and are connected to this bus by means of current transformers 32 and 33. The potential coils 30 and 30′ are connected across the phase conductors of the bus 2 by means of potential transformers 34 and 35. The movable element 31 of the wattmeter is arranged to control the position of a contact arm 36. A spring 37 is connected to the arm 36 and arranged in such a manner as to exert a force opposite to the force tending to turn the movable element 31 towards its maximum indicating position. The arm 36 is also provided with suitable damping means indicated as a dashpot 37′.

Between the load resistors 8a, 8b and 8c and the conductors 28 I interpose suitable switches 38a, 38b and 38c, respectively. These switches are provided with closing coils 39a, 39b, and 39c, and are arranged so that they occupy a circuit-interrupting position when the closing coils are deenergized and a circuit-closing position when the closing coils are energized. Any suitable type of switch may be used but a simple air-brake type of switch will be satisfactory in this instance since the circuits between the load devices 8a, 8b, and 8c and the conductors 28 are made before the switch is closed. The closing coils 39a, 39b, and 39c are energized in accordance with the position of the wattmeter arm 36 which cooperates with contacts 40a, 40b, and 40c to close a circuit from a source of supply 41 through any one of the closing coils depending upon the particular contact with which it engages.

The operation of the arrangement illustrated in Fig. 2 is substantially as follows: It will be assumed that the generator 1 is in operation and supplying a load over the transmission line 3 at the normal operating voltage under balanced current and voltage conditions. For purposes of explanation it will be assumed that the resistors 8b draw twice the load of resistors 8a and that resistors 8c draw twice the load of resistors 8b. Hence, as the load increases or decreases on the transmission line 3 the wattmeter device will move the contact arm over the contact 40a, 40b, and 40c to energize the closing coils 39a, 39b, or 39c as the case may be and will change the amount of load connected across the intermediate bus 28. It will of course be obvious to those skilled in the art that the number of steps and increments of change may be varied in any suitable manner from that illustrated in the drawing without departing from my invention in its broader aspects. Hence, resistors varying in load capacity from zero to a maximum in any suitable number of steps are connected to the intermediate bus 28 in accordance with the variations in load on the generator 1. In the event of a fault or short circuit on the transmission line 3 the fault-responsive device 21 will close the energizing circuit for the circuit of operating coil 16, and switch 9 will operate to connect the intermediate bus 28 and consequently the resistance load connected thereto across the generator bus 2 so as to slow the generator down at approximately the same speed as the system subjected to the fault.

In Fig. 3 of the drawings I have shown a modification of my invention wherein means are provided for connecting across the generator terminals a load which is determined by the amount of load suddenly lost over the transmission line. In this modification the apparatus corresponding to that shown in Figs. 1 and 2 is designated by corresponding reference numerals. In this arrangement a relay 42 is employed to control the energization of the closing coils of the switches 38a, 38b, and 38c which are used to connect the resistors 8a, 8b, or 8c across the auxiliary bus 28.

The relay 42 which is arranged to indicate rapidly sudden changes in power consists of three parts: a stationary element 43, a fast-moving element 44, and a slow-moving element 45. The stationary element 43 consists of the usual alternating current motor stator structure preferably having salient poles arranged in 120 degrees spaced relationship, for a three-phase system, and the windings 46 wound thereon and connected to be energized in accordance with the voltage across the low-voltage bus 2. The fast-moving element 44 consists of three conductors 47 placed respectively in front of the three appropriate poles of the stationary element and connected to slip rings 48 or flexible leads at one end and interconnected by a neutral connecting bracket 49 at the other end. The conductors 47 are connected to be energized in accordance with the current supplied by generator 1. If it is found to be sufficient to replace any load dropped from the transmission line by an equal amount connected to the low-voltage bus 2 the conductors 47 will only have to be connected by current transformers between the generator terminals and the point of connection of the auxiliary bus 28. It may, however, be desirable to throw on the bus 28 more load than is lost from the transmission line in order to slow down the generator instead of holding its speed approximately constant. This may be accomplished as shown in the drawings by energizing the conductors 47 from two sets of current transformers 50 and 51, connected respectively in the series relation with the auxiliary bus 28 and the low-voltage generator bus 2 beyond the connection point of the auxiliary bus 28. The ratio of the transformers 50 being higher than the ratio of the transformers 51 in the ratio by which the load thrown on the auxiliary bus 28 is to exceed the load lost over the transmission line. The slow-moving element 45 may be any piece of material free to rotate about the same axis as the fast-moving element and of sufficient mass so that it does not move in 15 or 20 cycles and sufficient damping to prevent oscillation. It is driven only by a weak spring 52 which interconnects the two members. The fast-moving element carries a contact 53 which is arranged in spaced relationship with a contact 54 carried by the slow-moving element 45. Under normal operating conditions the torque of the fast-moving element 44 is counterbalanced by a spring 55. If load is suddenly dropped from the transmission line 3 the contacts 53 and 54 are arranged to close.

The contacts 53 and 54 are connected in a circuit through sliding contacts 53' and 54' with the closing coils 39a, 39b, and 39c of the switches 38a, 38b, and 38c respectively from a suitable source of current indicated by the conductors 56. In this instance these switches are preferably arranged for quick closing and of the type suggested for switch 9 in the modification illustrated in Fig. 1. The contacts 19 and 20 of the voltage-responsive device 21 are also connected in series relation with the circuit through contacts 53 and 54 to prevent operation of the switches 38a, 38b, and 38c in case a sudden decrease in load arises from sources other than faults, such as may be occasioned by switching. The use of the device 21 in this connection is optional and may be dispensed with if operating conditions are such that switching surges do not cause operation of the device 42. The circuit through the contacts 19 and 20 and 53 and 54 is the circuit for controlling auxiliary relays 57, 58, and 59 which control the energization of the switch-closing coils 39a, 39b, and 39c, respectively. The relay 57 is provided with a contact 60 for controlling the circuit through the closing coil 39a, an operating winding 61, and a holding winding 62 connected in series relation with the winding 39a. Similarly, the relay 58 is provided with a contact 63 in circuit with the closing coil 39b, an operating winding 64, and a holding winding 65, while relay 59 is provided with a contact 66 connected in circuit with the closing coil 39c, an operating winding 67 and a holding winding 68. Switch 38a is provided with an auxiliary switch 69 which is arranged to close the circuit through the operating winding of relay 58 a very short time after switch 38a is closed. Similarly switch 38b is provided with a switch 70 which is arranged to close the circuit through the operating winding of relay 59 a very short time after switch 38b is closed. In other words the operation of relays 58 and 59 is determined by the operation of the switch preceding in the sequence of closing.

In order that the resistance load may be connected across the generator terminals for a predetermined period of time and then disconnected I provide a time element relay 71 which is arranged to open the energizing circuit to the closing coils 39a, 39b, and 39c of the resistor switches after a predetermined time interval. Although various types of time element relays well known in the art may be used without departing from my invention in its broader aspects I have shown by way of example a time element relay of the type described and claimed in an application of Benjamin W. Jones, Serial No. 157,815, filed December 29, 1926, and assigned to the same assignee as this application. The time element relay 71 is provided with an operating electromagnet 72 which is connected through a spring 73 to operate the contact 74 to the open position upon energization of the electromagnet. The time element mechanism 75, preferably of the gear-escapement type as indicated in the drawing, is connected by suitable gearing, such as the rack 76 and the ratchet pinion 77 to the electromagnet 72 so as to delay the opening of the contact 74 for a time interval after the energization of the operating electromagnet. A dashpot 78 is connected to the contact member 74.

The operation of the arrangement shown in Fig. 3 is substantially as follows: It will be assumed that the generator 1 is in operation and supplying a load over the transmission line 3 at the normal operating voltage under balanced current and voltage conditions. For purposes of explanation it will be assumed that the resistors 8a, 8b, and 8c have substantially equal impedance values in this instance. Now if load is suddenly dropped from the transmission line 3 due to short-circuit conditions the contacts 19 and 20 will close in the same manner as described hereinbefore and contacts 53 and 54 will close substantially simultaneously therewith. The loss of load will cause the fast-moving element 44 to move quickly under the bias of spring 55 but the slow-moving element 45 due to its inertia starts to move only very slowly. As a result the spring 52 is stressed and the contact 53 makes engagement with the contact 54. When contacts 19 and 20 and 53 and 54 are in engagement a circuit is completed from the source 56 through the operating winding 61 of relay 57. Upon the energization of winding 61 its contact 60 is moved to close a circuit through the closing coil 39a of the switch 38a and this switch is moved to connect resistors 8a across the auxiliary bus 28 and consequently across the terminals of generator 1. The holding coil 62 of relay 57 is energized to maintain contact 60 closed so long as the closing coil 39a is energized. The auxiliary switch 69 operated in accordance with the operation of switch 38a closes slightly after the main switch contacts close. If at the time switch 69 closes the power indicated by the relay 42 is less than that indicated before the fault, a circuit is completed for the operating winding 64 of the relay 58. As a consequence contact 63 is moved to close the circuit through closing coil 39b and as a consequence the switch 38b is moved to connect additional resistors 8b across the generator terminals. The holding coil 65 of relay 58 is energized to maintain contact 63 in its circuit-closing position so long as the closing coil 39b is energized. The auxiliary switch 70 operated in accordance with the operation of switch 38b closes slightly after the main switch contacts close to close a break in the circuit to the operating winding 67 of relay 59. If the power indicated by the relay 42 is still less than that indicated before the fault the operating winding 67 moves its contact 66 to close an energizing circuit for the closing winding 39c of switch 38c and as a consequence switch 38c is moved to connect additional resistors 8c across the generator terminals. The time interval in the sequence of closing of the resistor switches 38a, 38b, and 38c is preferably of the order of 2 or 3 cycles.

During the above-described cycle of operation the time element relay 71 becomes energized when the relay 57 closes contact 60 and the switch 38a is moved to its circuit-closing position. As soon as the electromagnet 72 is energized due to the closing of contact 60 the rack 76 is arranged to be pulled up by the solenoid, as viewed in the drawing, and the spring 73 is stressed due to the action of the dashpot 78. The gear escapement mechanism 75 introduces a time interval between the initial stress on the spring 73 and the stress on the spring 73 sufficient to open the contact 74 which is preferably of the order of one or two seconds. In other words the resistors are connected across the generator terminals for a predetermined interval of time, such for example as one or two seconds, by reason of the time delay in the opening of contact 74 and the action of the holding coils on each relay irrespective of the engagement of the contacts 19 and 20 and 53 and 54 after the switches 38a, 38b, and 38c have been closed. As soon as the electromagnet 72 is deenergized due to the opening of contact 74 the rack 76 due to its gravity bias is lowered by the gear escapement 75 in a predetermined interval of time. In other words the contact 74 is arranged to be maintained in a circuit-interrupting position for a time interval of the order of one or two seconds. The resistors are thus connected across the generator until the fault has been cleared and then disconnected long enough by the operation of the drop-out relay 71 so that the relay 42 will have a chance to come to rest. If relay 21 is used in connection with relay 42 it will not be necessary to introduce the time delay in the closing of contact 74. By disconnecting the resistor load at an appropriate time a desirable gain in power limit is obtained under short-circuit conditions and transient fault disturbances which are encountered in practice.

While I have shown and described particular embodiments of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In a system of distribution, a distribution circuit, a synchronous alternating current generating source connected thereto for operation in synchronism therewith, an auxiliary power consuming device normally disconnected from said generating source, and means operative in accordance with faults on said distribution circuit for connecting said auxiliary power consuming device to said generating source between the point of said fault and the terminals of said generating source to maintain conditions for synchronous operation between said source and said distribution circuit.

2. In a system of distribution, a distribution circuit, a synchronous alternating current generating source connected thereto for operation in synchronism therewith, an auxiliary power consuming device normally disconnected from said generating source, and means operative in accordance with ground faults on said distribution circuit for connecting said auxiliary power consuming device to the terminals of said generating source to maintain conditions for synchronous operation between said source and said distribution circuit.

3. In a system of distribution, a synchronous dynamo-electric machine, a transmission line connected to said dynamo-electric machine, an auxiliary substantially non-reactive load normally disconnected from said generator, and means operative in accordance with a function of symmetrical phase sequence components of an electrical characteristic of said transmission line for controlling the connection of said non-reactive load across the terminals of said dynamo-electric machine when said transmission line is subjected to short-circuit conditions.

4. In a system of distribution, a synchronous dynamo-electric machine, a transmission line connected to said dynamo-electric machine, an auxiliary substantially non-reactive load normally disconnected from said generator, and means responsive to a symmetrical phase sequence component of an electrical characteristic of said transmission line for controlling the connection of said non-reactive load across the terminals of said dynamo-electric machine when said transmission line is subjected to short-circuit conditions.

5. In a system of distribution, a synchronous alternating current generator, a transmission line connected to be energized thereby, an auxiliary non-reactive load arranged to be connected across the generator terminals, a quick-closing normally open switch interposed between said generator terminals and said auxiliary load, and a polyphase torque motor connected to be responsive to the voltage across said transmission line for controlling the operation of said switch to its circuit-closing position when the voltage of any one phase decreases below a predetermined value.

6. In a system of distribution, an alternating current generator, a transmission line connected to be energized thereby, auxiliary power consuming means normally disconnected from said generator, means for varying the impedance of said auxiliary power consuming means in accordance with the power delivered to said transmission line, and means for connecting said auxiliary power consuming means to said generator when said transmission line is subjected to short-circuit conditions.

7. In a system of distribution, an alternating current generator, a transmission line connected to said generator, an auxiliary variable resistor load arranged to be connected across said generator terminals, power responsive means connected to be responsive to the power delivered over said transmission line for varying the resistance of said auxiliary load in accordance with variations in said delivered power, and a polyphase torque motor connected to be responsive to the voltage of said transmission line for controlling the connection of said auxiliary load across the terminals of said generator when said transmission line is subjected to a fault.

8. In a system of distribution, an alternating current generator, a transmission line connected to said generator, a plurality of resistor units normally disconnected from said generator, and fault responsive means operative when the load on said generator is suddenly changed for connecting resistor units across the terminals of said generator in accordance with the magnitude of the load change.

9. In a system of distribution, an alternating current generator, a transmission line connected to said generator, a plurality of auxiliary power consuming devices having different impedance values normally disconnected from said generator, and means for automatically selecting and connecting predetermined auxiliary power consuming devices across the terminals of said generator in accordance with the amount of load suddenly lost over said transmission line.

10. In a system of distribution, a distribution circuit, an alternating current generating source connected thereto, an auxiliary power consuming device normally disconnected from said generating source, and means responsive to a function of a symmetrical phase sequence component of an electrical condition of said transmission line for connecting said auxiliary power consuming device to said generating source during said fault and disconnecting said auxiliary power consuming device from said generating source when normal operating conditions are restored.

11. In a system of distribution, a distribution circuit, a synchronous alternating current generating source connected thereto, an auxiliary power consuming device normally disconnected from said generating source, means responsive to faults which decrease the load on said generating source for connecting said auxiliary power consuming device to said generating source when said distribution circuit is subjected to a fault, and means for disconnecting said auxiliary power consuming device from said generating source when normal operating conditions are restored in said distribution circuit.

12. In a system of distribution, an alternating current generator, a distribution circuit connected thereto, an auxiliary non-reactive load device normally disconnected from said generator, means responsive to a sudden drop in load over said distribution circuit for connecting said auxiliary load device to said generator, and means operative after a predetermined time interval for disconnecting said auxiliary load device from said generator.

13. In a system of distribution, an alternating current generator, a transmission line connected to said generator, auxiliary power consuming means normally disconnected from said generator, means for automatically selecting and connecting power consuming means of a predetermined impedance across the terminals of said generator in accordance with the amount of load suddenly dropped from said transmission line, and means for disconnecting said auxiliary power consuming means from said generator after a predetermined time interval.

14. In a system of distribution, an alternating current generator, a transmission line connected to said generator, a plurality of resistor units normally disconnected from said generator, a plurality of main switches each having an operating winding and arranged one for each resistor unit to connect said resistor units to said generator, a plurality of relays arranged one for each switch to control the energization of said operating windings, a power responsive device connected to be responsive to load suddenly dropped from said transmission line for controlling the energization of said relays, auxiliary switches on each main switch preceding in the sequence of closing for controlling the energization of a relay associated with a main switch succeeding in the sequence of closing, and a time element relay for simultaneously controlling the energization of all of said switch operating windings.

15. In a system of distribution, an alternating current generator, a transmission line connected to said generator, a plurality of resistor units normally disconnected from said generator, a plurality of main switches each having an operating winding and arranged one for each resistor unit to connect said resistor units to said generator, a plurality of relays arranged one for each switch to control the energization of said operating windings, a polyphase torque motor connected to be responsive to the voltage of said transmission line and a power responsive device connected to be responsive to load suddenly dropped from said transmission line for jointly controlling the energization of said relays, auxiliary switches on each main switch preceding in the sequence of closing for controlling the energization of a relay associated with a main switch succeeding in the sequence of closing, and a time element relay for simultaneously controlling the energization of all of said switch operating windings.

In witness whereof I have hereunto set my hand this 29th day of August, 1929.

WILFRED F. SKEATS.

DISCLAIMER 1,834,807.—*Wilfred F. Skeats*, Scotia, N. Y. SYSTEM OF ELECTRICAL DISTRIBUTION. Patent dated December 1, 1931. Disclaimer filed September 29, 1932, by the assignee, *General Electric Company*.

Hereby enters this disclaimer to that part of the claim in said specification which is in the following words, to wit:

"1. In a system of distribution, a distribution circuit, a synchronous alternating current generating source connected thereto for operation in synchronism therewith, an auxiliary power consuming device normally disconnected from said generating source, and means operative in accordance with faults on said distribution circuit for connecting said auxiliary power consuming device to said generating source between the point of said fault and the terminals of said generating source to maintain conditions for synchronous operation between said source and said distribution circuit.

"2. In a system of distribution, a distribution circuit, a synchronous alternating current generating source connected thereto for operation in synchronism therewith, an auxiliary power consuming device normally disconnected from said generating source, and means operative in accordance with ground faults on said distribution circuit for connecting said auxiliary power consuming device to the terminals of said generating source to maintain conditions for synchronous operation between said source and said distribution circuit.

"3. In a system of distribution, a synchronous dynamo-electric machine, a transmission line connected to said dynamo-electric machine, an auxiliary substantially non-reactive load normally disconnected from said generator, and means operative in accordance with a function of symmetrical phase sequence components of an electrical characteristic of said transmission line for controlling the connection of said non-reactive load across the terminals of said dynamo-electric machine when said transmission line is subjected to short-circuit conditions.

"4. In a system of distribution, a synchronous dynamo-electric machine, a transmission line connected to said dynamo-electric machine, an auxiliary substantially non-reactive load normally disconnected from said generator, and means responsive to a symmetrical phase sequence component of an electrical characteristic of said transmission line for controlling the connection of said non-reactive load across the terminals of said dynamo-electric machine when said transmission line is subjected to short-circuit conditions."

"8. In a system of distribution, an alternating current generator, a transmission line connected to said generator, a plurality of resistor units normally disconnected from said generator, and fault responsive means operative when the load on said generator is suddenly changed for connecting resistor units across the terminals of said generator in accordance with the magnitude of the load change."

"10. In a system of distribution, a distribution circuit, an alternating current generating source connected thereto, an auxiliary power consuming device normally disconnected from said generating source, and means responsive to a function of a symmetrical phase sequence component of an electrical condition of said transmission line for connecting said auxiliary power consuming device to said generating source during said fault and disconnecting said auxiliary power consuming device from said generating source when normal operating conditions are restored.

"11. In a system of distribution, a distribution circuit, a synchronous alternating current generating source connected thereto, an auxiliary power consuming device normally disconnected from said generating source, means responsive to faults which decrease the load on said generating source for connecting said auxiliary power consuming device to said generating source when said distribution circuit is subjected to a fault, and means for disconnecting said auxiliary power consuming device from said generating source when normal operating conditions are restored in said distribution circuit.

"12. In a system of distribution, an alternating current generator, a distribution circuit connected thereto, an auxiliary non-reactive load device normally disconnected from said generator, means responsive to a sudden drop in load over said distribution circuit for connecting said auxiliary load device to said generator, and means operative after a predetermined time interval for disconnecting said auxiliary load device from said generator."

[*Official Gazette October 18, 1932.*]